United States Patent Office 2,842,448
Patented July 8, 1958

2,842,448
SODIUM SILICATE ADHESIVE

John E. Dereich, Painesville, Ohio, assignor to Diamond Alkali Company, Cleveland, Ohio, a corporation of Delaware No Drawing. Application May 13, 1953
Serial No. 354,886

5 Claims. (Cl. 106—82)

This invention relates to compositions of matter comprising aqueous adhesive silicate glass, which compositions are characterized by high adhesiveness to cellulose-containing materials, such as paper surfaces employed in laminated paper articles, but which are also characterized by lack of adhesion to heated metal surfaces. The compositions of the invention are further characterized by a high degree of plasticity under conditions to which they are subjected in use.

One of the steps of a typical paper laminating operation involves the pressing of the composite sheet after the adhesive has been applied to the plies and such plies have been arranged in laminated relationship. Generally, in the manufacture of corrugated paperboard, this operation is conducted by passing an advancing laminated web of paper over a series of heated platens and pressing the web against the heated platens by means of one or more rollers, whereby the silicate glass is dehydrated and the laminations are united, thus forming a bond between the laminates.

In the manufacture of corrugated paperboard and similar laminates, the silicate glass adhesive may, for example, be applied to the peaks of the corrugations on one side of a corrugated sheet, which sheet is then contacted with a plane-surface facing sheet, and the composite thus formed passed over heated platens, while being subjected to pressure insufficient to destroy the corrugations of the corrugated member but sufficient to effect the bonding of the paper sheets. Thereafter, in accordance with this exemplary method of forming 3-ply laminates, the laminated structure may be coated a second time with an adhesive silicate glass at the peaks of the exposed corrugated surface of the laminate, and the thus-coated structure then formed brought into contact with a second plane-surface and the whole laminate again passed in contact with heated platens, while being subjected to pressure insufficient to destroy the corrugations of the corrugated member but sufficient to effect bonding of the laminate.

Difficulties in the manufacture of such corrugated paperboard arise when aqueous adhesive silicate glass comes into contact with the corrugating and pressure rolls, and the platens of the hot plate driers, forming hard glass-like deposits thereon, thus fouling the rolls and necessitating interrupting production to remove said deposits. Further, as the laminated structure passes between the pressure rollers and the platens of the hot-plate driers, some of the adhesive silicate glass exudes from the portions of the laminate nearest the edges thereof and is deposited upon the heated surface of the platens. After a relatively short period of time, these deposits of the exuded adhesive silicate material accumulate upon the surface of the platens and build up into ridges or mounds near the region of the edges of the moving laminated web and under the influence of the relatively intense heat of the platen surface are dehydrated to a hard, strongly adherent, solid silicate glass. These deposits are then in a position to effect the destruction of the edges of the moving laminated structure passing across the heated platen surface. Moreover, as the production of laminated webs of lesser and greater widths may be scheduled alternately during a given production period, the changeover from the lesser to the greater widths may leave deposits of the dehydrated silicate glass in a position to mar substantial areas longitudinally of the wider webs. When the accumulation of the deposits of dehydrated silicate glass are sufficient to cause the destruction of substantial areas of the wider laminated webs passing thereover, the whole operation must be interrupted and the heated platens cleaned before further production of such wider webs may be started. A major difficulty in the cleaning operation arises from the fact that the dehydrated silicate glass adheres quite strongly to the platens, requiring considerable time and hand labor to dislodge the deposit and refinish the surface.

The present invention is directed to a composition and method for decreasing the adhesion of an adhesive silicate glass composition to heated metal surfaces generally.

Another object of the invention is to provide a method and composition for decreasing the adhesion of aqueous adhesive silicate glasses commonly employed in the paper laminating industry to the heated metal surfaces of the platens used to form laminates.

In manufacturing laminated materials, for example, boxboard as heretofore described, periodically it is necessary to interrupt normal operation of the equipment for a roll change or a break in the paper being processed. At such times, the board that is already on the drying platens is exposed to heat longer than usual and, consequently, the silicate bond is dehydrated to such an extent that the board is unusable and must be discarded, the adhesive becoming quite brittle. As this is a substantial quantity of board, its loss is significant and the industry welcomes a contribution to the art that permits avoiding the loss.

It is therefore a further object of this invention to provide a method and composition which in use does not involve a board loss due to adhesive dehydration under normal operating conditions.

These and other objects will occur to those skilled in the art from the description of the invention set forth below.

The present invention contemplates the combination of a major proportion of aqueous silicate solution with materials which, while they do not interfere with the ultimate adhesiveness of the dehydrated adhesive silicate glass, nevertheless provide properties of non-adhesiveness to the heated metallic surfaces which come in contact with the composition, especially parts of boxboard manufacturing equipment, and which avoids board loss due to over-dehydration.

Silicate adhesives are well known in the art. They are composed of a wide variety of materials which adapt them to numerous requirements. Basically, and usually in boxboard manufacture where the product is cellulosic, silicate adhesives include sodium silicate as an aqueous adhesive silicate glass solution in which the solids content, i. e., sodium silicate constituent, may range from abuot 35–45% and in which, on the average, the ratio of $Na_2O$ to $SiO_2$ in parts by weight falls between about 1 to 2.5 to 4. To this basic adhesive, suitable modifiers, diluents and the like are commonly added to form the silicate adhesives in which the problems herein described are encountered. For example, it is quite usual to add in small quantity, e. g., up to approximately 15% of the total weight of the composition, an extender such as a finely divided clay, suitably Barden Clay or other similar clay of the order of an average particle size of a few microns diameter or a material functioning similarly such as soybean meal, woodflour, starch, etc.; corrosion inhibitor may be present if necessary of which the alkali metal chromates are exemplary and, more commonly, sodium bichromate, in quantity of about .1 to 1% by weight. Additionally, the compositions are oftentimes diluted with water to suit particular flow requirements.

The present invention for its purposes, includes the addition of a modifying agent to such well known and similar aqueous adhesive silicate glass compositions which effects new and novel results. It is to be understood, however, that essentially the invention includes the addition of the herein disclosed modifying agent to an aqueous adhesive silicate glass solution, it being contemplated that skilled formulators, having knowledge of the foregoing described variety of compositions which may suitably be prepared, can and will adapt the teaching herein to their own particular requirements. The new modifier with which the invention may be practiced is one or more of a group of chemical compounds of the class of metal salts of organic acids, more specifically alkyl and cyclic organic acids having from about six to about 12 carbon atoms, preferably, however, from about 7 to about 9 carbon atoms. Representative acids are such as hexanoic (caproic), octanoic (caprylic), benzoic, toluic, tolylacetic, napthenic acid (hexahydrobenzoic acid), isomers and mixtures of these and other acids, for example, mixtures of aromatic acids as found in natural resins commonly termed resin acids, likewise, lower alkyl derivatives of any of such acids may be employed. Various salt forming metals may be utilized among such being manganese, cobalt, copper, cerium, lead, zinc, calcium, tin and aluminum.

A particularly suitable material which may be employed with excellent results is the product sold under the trademark "Nuodex." This product contains 8% copper as copper napthenate and is a solution thereof in mineral spirits, the napthenate being present in quantity of about 80% by weight of the solution, and the mineral spirits accounting for the remainder to 100 parts.

This invention contemplates the addition of such metal organic acid salts to aqueous adhesive silicate glass solutions and compositions in quantities sufficient to decrease the adhesion of such solutions and compositions to heated metal surfaces generally, and especially heated metal surfaces of apparatus employed in effecting an adhesive bond between a plurality of cellulosic webs, the decrease in adhesion being to such extent that adhering bonding agent is easily removable by light mechanical action as applied, for example, by a hand or fixed scraper, or by the action of moving webs as they may come into contact with the adhering material in moving through the laminating apparatus. The invention contemplates also improvements in the method or process of laminating webs of cellulosic material wherein heat and pressure are applied to effect lamination and, in consequence thereof, adhesive material is expressed from between the materials undergoing lamination and is deposited upon the heated metal surfaces of the laminating apparatus, there to adhere and harden to a difficultly removable state, the improvements comprising employing the metal organic acid salt-modified bonding agents or adhesives as described herein to bond the webs. Also, the invention contemplates that the specific lamination method herein described and other methods may employ the herein disclosed bonding agents whether or not they involve the serious problem caused by the adhesive to metal bond, it being considered that the bonding agents of the invention have improved plasticity which reduces board loss due to overheating. Thus, the invention contemplates application of the bonding agents to processes and methods in general where similar or analogous problems are encountered and which are obviated by the bonding agents and methods herein disclosed.

The invention comprises the addition of such metal organic acid salts to aqueous adhesive silicate glass solutions, and compositions including such solutions, in any quantity that accomplishes the purposes of the invention. The relative proportion of ingredients of the bonding agents of the invention is not highly critical. Indeed, the addition of the specified metal salts in quantity somewhat larger than actually necessary for the purposes of the invention does not produce an intolerable condition in use. Generally, however, the invention contemplates that a metal salt of the organic acids specified herein or other similar acids will be added to aqueous adhesive silicate glass solution, containing on the average 35–45% solids and averaging on the weight basis 1 part $Na_2O$ to between 2.5 and 4 parts $SiO_2$ and suitably within the range of $1Na_2O$ to 3-3.5 $SiO_2$, preferably about $1Na_2O$ to 3.3 parts $SiO_2$, and which solution may suitably contain a small amount, for example about 1%, of an anionic wetting agent, of which aromatic monosodium sulfonate derived from petroleum oil, alkyl aryl sulfonates, coconut oil sulfonates, and the like are examples, to the extent of about 0.1 to about 1% taken by weight of the aqueous silicate glass solution, preferably about 0.5 to about 0.75%. As indicated previously, other materials may be added as desired for particular purposes.

The manner of compounding the compositions of this invention is in no sense critical. In practice, the particular metal organic acid salt that is selected to be combined with the silicate solution or composition is simply added thereto with sufficient agitation to effect a suitably homogeneous dispersion.

The following are specific examples of the bonding agents and methods of this invention:

Example I

| | Approximate parts by weight |
|---|---|
| Silicate | 99.25 |
| Copper naphthenate solution | 0.75 |

Example II

| | |
|---|---|
| Silicate | 99.50 |
| Cobalt naphthenate solution | 0.50 |

Example III

| | |
|---|---|
| Silicate | 99.00 |
| Calcium naphthenate solution | 1.00 |

Example IV

| | |
|---|---|
| Silicate | 99.30 |
| Lead naphthenate solution | .70 |

Example V

| | |
|---|---|
| Silicate | 99.25 |
| Copper resinate solution | .75 |

Example VI

| | |
|---|---|
| Silicate | 99.50 |
| Copper caprylate solution | .50 |

Example VII

| | |
|---|---|
| Silicate | 99.25 |
| Calcium toluate solution | .75 |

Example VIII

| | |
|---|---|
| Silicate | 99.00 |
| Copper hexanoate solution | 1.00 |

Example IX

| | |
|---|---|
| Silicate | 99.20 |
| Zinc resinate solution | .80 |

In the foregoing examples the term "silicate" is employed to define an aqueous silicate glass solution having an $Na_2O:SiO_2$ ratio of about 1 to 3.3 and a solids content of 37.7–8%. The metal salts are in solution in mineral spirits, the salts comprising about 80 parts thereof by weight.

The compositions so prepared are found to give substantially equivalent results, although the composition of Example I is preferred, when employed in a typical paperboard lamination process; bonding agents prepared in accordance with the foregoing examples are easily released from the metal surfaces. Additionally, the adhesive bonds between the webs exhibit a high degree of plasticity after the webs have stood on the heated surfaces for long periods of time.

While there have been described various embodiments of the invention, the methods and products described are not intended to be understood as limiting the scope of the invention as it is realized that changes therewithin are possible and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. An adhesive composition of matter characterized by strong adhesion to cellulosic materials and slight adhesion to heated metal surfaces, said composition consisting essentially of an aqueous adhesive silicate glass having an $Na_2O:SiO_2$ ratio substantially within the range of 1:2.5–4, in the major proportion, and 0.1% to 1% of a salt of an organic acid selected from the group consisting of saturated aliphatic alkyl, saturated aliphatic cyclic and aromatic acids having from 6 to 12 carbon atoms in the molecules thereof, the metal constituent of said salt being selected from the group consisting of manganese, cobalt, copper, cerium, lead, zinc, calcium, tin, and aluminum, the amount of said salt being sufficient to render said silicate glass non-adhesive to heated metallic surfaces.

2. A composition as claimed in claim 1 wherein the metal constituent of said salt is copper.

3. A composition as claimed in claim 1 wherein said salt is a salt of naphthenic acid.

4. A composition as claimed in claim 1 wherein said salt is the copper salt of naphthenic acid.

5. A composition as claimed in claim 3 wherein the $Na_2O:SiO_2$ ratio is substantially 1:3.3.

References Cited in the file of this patent
UNITED STATES PATENTS

| | | |
|---|---|---|
| 1,967,829 | Lemmerman | July 24, 1934 |
| 2,181,811 | Hughes | Nov. 28, 1939 |
| 2,234,183 | Lofgren | Mar. 11, 1941 |
| 2,610,920 | Hopkinson | Sept. 16, 1952 |
| 2,671,747 | Lander | Mar. 9, 1954 |